(12) United States Patent
Durkovic

(10) Patent No.: US 11,192,419 B2
(45) Date of Patent: Dec. 7, 2021

(54) BEARING SPRING/DAMPER SYSTEM OF A VEHICLE WHEEL

(71) Applicant: Bayerische Motoren Werke Aktiengesellschaft, Munich (DE)

(72) Inventor: Martin Durkovic, Zvolen (SK)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 168 days.

(21) Appl. No.: 16/711,704

(22) Filed: Dec. 12, 2019

(65) Prior Publication Data

US 2020/0114720 A1    Apr. 16, 2020

Related U.S. Application Data

(63) Continuation of application No. PCT/EP2018/070035, filed on Jul. 24, 2018.

(30) Foreign Application Priority Data

Jul. 26, 2017 (DE) .................... 10 2017 212 882.8

(51) Int. Cl.
| | |
|---|---|
| *B60G 13/08* | (2006.01) |
| *B60G 15/06* | (2006.01) |
| *B60G 17/027* | (2006.01) |
| *F16F 9/06* | (2006.01) |
| *F16F 9/18* | (2006.01) |
| *F16F 9/32* | (2006.01) |
| *F16F 9/43* | (2006.01) |
| *F16F 9/50* | (2006.01) |

(52) U.S. Cl.
CPC .......... *B60G 15/061* (2013.01); *B60G 13/08* (2013.01); *B60G 17/0272* (2013.01);
(Continued)

(58) Field of Classification Search
CPC .. B60G 15/061; B60G 13/08; B60G 17/0272; B60G 15/065; B60G 2202/24;
(Continued)

(56) References Cited

U.S. PATENT DOCUMENTS 2,902,274 A * 9/1959 McIntyre ............. B60G 15/063
    267/225
4,830,395 A * 5/1989 Foley ................. B60G 17/0272
    267/177

(Continued)

FOREIGN PATENT DOCUMENTS

DE         101 21 918 A1    11/2002
DE    10 2004 011 632 B3     8/2005
(Continued)

OTHER PUBLICATIONS

International Search Report (PCT/ISA/210) issued in PCT Application No. PCT/EP2018/070035 dated Nov. 7, 2018 with English translation (seven pages).

(Continued)

*Primary Examiner* — Frank B Vanaman
(74) *Attorney, Agent, or Firm* — Crowell & Moring LLP

(57) ABSTRACT

A bearing spring/damper system of a vehicle wheel has a hydraulic vibration damper consisting of a damper cylinder and a damper piston guided therein, the piston rod of which hydraulic vibration damper is fastened to the vehicle body, whilst the damper cylinder is supported to a wheel guiding element. A pretension spring is clamped functionally between the damper piston and a pretension piston which can be displaced hydraulically in the longitudinal direction of the piston rod. The pretension piston is supported hydraulically with respect to the damper cylinder by a support chamber filled with the hydraulic medium of the vibration damper, and can be displaced by a conveying device, which conveys hydraulic medium into or out of the support chamber. The pretension spring is parallel-connected in every possible position of the pretension piston of a bearing spring ultimately clamped between the vehicle body and the wheel for force transmission.

6 Claims, 3 Drawing Sheets

(52) U.S. Cl.
CPC .............. *F16F 9/062* (2013.01); *F16F 9/063* (2013.01); *F16F 9/182* (2013.01); *F16F 9/185* (2013.01); *F16F 9/3221* (2013.01); *B60G 15/065* (2013.01); *B60G 2202/24* (2013.01); *B60G 2202/312* (2013.01); *B60G 2206/41* (2013.01); *B60G 2500/10* (2013.01); *B60G 2500/30* (2013.01); *B60G 2800/162* (2013.01); *F16F 9/064* (2013.01); *F16F 9/43* (2013.01); *F16F 9/50* (2013.01); *F16F 2228/066* (2013.01)

(58) Field of Classification Search
CPC .......... B60G 2202/312; B60G 2206/41; B60G 2500/10; B60G 2500/30; F16F 9/062; F16F 9/063; F16F 9/182; F16F 9/185
See application file for complete search history.

(56) References Cited

U.S. PATENT DOCUMENTS

| | | | | |
|---|---|---|---|---|
| 5,005,855 | A * | 4/1991 | Lee ........................ | B60G 3/26 280/124.147 |
| 7,360,776 | B2 * | 4/2008 | Bryant .................. | B60G 15/06 267/221 |
| 2005/0199457 | A1 | 9/2005 | Beck | |
| 2013/0200589 | A1 * | 8/2013 | Cox .................... | B60G 15/065 280/124.162 |
| 2014/0217693 | A1 | 8/2014 | Schmidt et al. | |
| 2015/0028551 | A1 | 1/2015 | Reybrouck | |
| 2018/0259030 | A1 * | 9/2018 | Von Tardy-Tuch ..... | F16F 9/504 |

FOREIGN PATENT DOCUMENTS

| | | |
|---|---|---|
| DE | 10 2004 013 559 A1 | 10/2005 |
| DE | 10 2011 084 089 A1 | 4/2013 |
| EP | 1 477 343 A2 | 11/2004 |
| EP | 1 477 343 B1 | 6/2006 |
| EP | 2 923 937 A1 | 9/2015 |

OTHER PUBLICATIONS

German-language Written Opinion (PCT/ISA/237) issued in PCT Application No. PCT/EP2018/070035 dated Nov. 7, 2018 (eight pages).

German-language Search Report issued in counterpart German Application No. 10 2017 212 882.8 dated Mar. 20, 2018 with partial English translation (11 pages).

* cited by examiner

BEARING SPRING/DAMPER SYSTEM OF A VEHICLE WHEEL

CROSS REFERENCE TO RELATED APPLICATIONS

This application is a continuation of PCT International Application No. PCT/EP2018/070035, filed Jul. 24, 2018, which claims priority under 35 U.S.C. § 119 from German Patent Application No. 10 2017 212 882.8, filed Jul. 26, 2017, the entire disclosures of which are herein expressly incorporated by reference.

BACKGROUND AND SUMMARY OF THE INVENTION

The invention relates to a bearing spring/damper system of a vehicle wheel, having a hydraulic vibration damper which consists of a damper cylinder and a damper piston which is guided in said damper cylinder, the piston rod of said hydraulic vibration damper preferably being fastened to the vehicle body while the damper cylinder is supported on a wheel-steering element, and wherein a pretensioning spring is functionally clamped or supported between the damper piston and a pretensioning piston, which can be hydraulically displaced in the piston rod longitudinal direction, in the damper cylinder, in particular to a bearing spring/damper system. Reference is made to EP 1 477 343 B1 with respect to the prior art.

Spring/damper systems for vehicle wheels of various embodiments are known. In the case of a two-axle or two-track motor vehicle, which is a preferred application for the present invention, each wheel-specific bearing spring, which is provided on the other side of the damper—and so as to envelop the damper in the case of a damper spring leg—supports approximately a quarter of the mass of the vehicle body, while the damper, as a hydraulic vibration damper, damps compression and rebound movements of the bearing spring resulting, for example, from said vehicle traveling over uneven surfaces. In simple dampers, a so-called rebound buffer spring is usually also provided, said rebound buffer spring having a relatively high spring rate and taking effect only in the end range of the damper rebound, that is to say when the bearing spring rebounds strongly and the damper piston reaches its (upper) end stop in the damper cylinder. Various possibilities or embodiments with the aid of which the so-called height of the vehicle body can be changed, that is to say which can usually raise or lower the vehicle body, for example substantially in a wheel-specific manner, in relation to the respective wheel by means of a suitable energy source, are also known.

It is hereby now sought to specify a bearing spring/damper system of particularly compact construction which renders possible a deliberate change in the vehicle height, that is to say the height of the vehicle body (above the wheel).

This object is achieved by a bearing spring/damper system of the type mentioned above characterized in that the pretensioning piston is hydraulically (functionally) supported in relation to the damper cylinder (or a damper tube which encloses said damper cylinder and forms a functional unit with the damper cylinder) by way of a supporting chamber which is filled with the hydraulic medium of the vibration damper, and can be moved by a conveying apparatus which conveys hydraulic medium into the supporting chamber or allows hydraulic medium to flow out of said supporting chamber. The pretensioning spring is functionally connected in parallel in a force-transmitting manner in every possible position of the pretensioning piston of the bearing spring which is (ultimately) clamped between the vehicle body and the wheel.

Therefore, the invention provides a so-called pretensioning spring which, according to the invention, is provided within the damper cylinder, which guides the damper piston, and acts on the damper piston directly or indirectly with the interposition of another element. At its other end, the pretensioning spring is ultimately and functionally supported on the damper cylinder or a damper tube, which forms a functional unit with the damper cylinder and in particular is structurally associated with the damper cylinder in such a way that there is no relative movement between these two elements, with the functional interposition of a hydraulically displaceable so-called pretensioning piston. (The words "ultimately" or "functionally" are intended to make it clear here that two elements are associated with one another in respect of their action or function, for example are supported one against the other, without this taking place directly; rather, indirect support or the like with the interposition of any other element is also possible).

Therefore, the pretensioning spring is functionally connected in parallel with the actual bearing spring of the spring/damper system since this bearing spring is also supported firstly directly or indirectly on the damper cylinder and secondly on the damper piston for all intents and purposes by way of the vehicle body and the piston rod, which is connected thereto, of the damper piston. It goes without saying that, when interpreted literally, the above applies only in the case where—as is mainly customary at present in passenger cars—that end of the piston rod which is averted from the damper piston is fastened to the vehicle body while the damper cylinder is supported directly or indirectly on an element which steers the associated wheel. However, in the case of an inverse arrangement, that is to say proportional support of the vehicle body on the damper cylinder and support of the damper piston by way of the piston rod on the wheel, the same parallel connection of a pretensioning spring according to the invention with the actual bearing spring is possible. For the sake of completeness, it should also be noted that, given the proposed parallel connection of the bearing spring and the pretensioning spring, the respective spring rates or spring stiffnesses of the bearing spring and pretensioning spring are added up in respect of their overall action.

According to the invention, the pretensioning piston which is hydraulically displaceable and acts on the pretensioning spring is supported by way of a so-called supporting chamber, which is filled with hydraulic medium and the volume of which can be changed by supplying or discharging hydraulic medium, on the damper cylinder or on a damper tube which surrounds the damper cylinder and is (mechanically) connected to said damper cylinder, so that, by displacing the pretensioning piston in the piston rod longitudinal direction (by means of a change in volume of this kind) with otherwise unchanged boundary conditions, the damper cylinder is displaced in relation to the damper piston by the pretensioning spring. This results locally (that is to say in relation to the respective bearing spring/damper system) in a change in the height of the vehicle body in relation to the wheel. The hydraulic fluid of the hydraulic vibration damper is preferably used as hydraulic medium in the supporting chamber, wherein a suitable conveying apparatus in the form of an electromotively driven pump or the like is provided for supplying hydraulic medium. The conveying apparatus preferably conveys the hydraulic fluid from a hydraulic space of the damper, which functions as a reservoir space or compensation space (as is known for the volume of the moving piston rod), into the supporting chamber or allows the hydraulic fluid to return from the supporting chamber into the reservoir space or compensation space. Suitably switchable valves can also be provided in suitably provided lines or ducts for the latter.

Therefore, for example, the damper or vibration damper can be constructed in the manner of a two-tube damper and the hydraulic supporting chamber, just like a compensation space (which is customary in two-tube dampers) for the hydraulic medium of the vibration damper, can be provided between the damper cylinder and a damper tube which encloses the damper cylinder so as to form an annular gap. A damper tube of this kind has already been mentioned above and forms a mechanical functional unit with the damper cylinder, wherein the damper tube and the damper cylinder virtually cannot execute a relative movement toward one another.

In the case of a bearing spring/damper system according to the invention, a customary air cushion for the hydraulic fluid in the compensation space is preferably located between the hydraulic fluid of the damper in the compensation space and a collar or the like of the pretensioning piston according to the invention, by way of which collar the pretensioning piston is supported on the hydraulic medium which is located in the supporting chamber. In this case, the conveying apparatus is hydraulically connected to the compensation space and to the supporting chamber.

Another advantageous development proposes a so-called secondary piston rod in addition to the customary and now so-called primary piston rod for the damper piston of a hydraulic vibration damper according to the invention, which two piston rods are designed to transmit forces between the damper piston and preferably the vehicle body in the piston rod longitudinal direction, and which two piston rods can be displaced slightly toward one another in the piston rod longitudinal direction. The actual so-called primary piston rod here, which is specifically substantially rigidly connected to the damper piston, is usually (and also in the present case) fastened by way of its end which is averted from the damper piston to the vehicle body by way of an elastic (rubber) bearing or elastomeric bearing or elastomeric element. (As has already been stated further above, an inverse arrangement is however also possible in principle, in accordance with which inverse arrangement the piston rod is supported on a wheel-steering element.) With the now additional force which is introduced into a bearing spring/damper system according to the invention when the pretensioning piston of said system is displaced and would therefore also enter the elastic bearing, there is a risk of the rubber bearing or elastomeric element hardening, this being undesirable in particular in respect of vibration insulation in the acoustically relevant frequency range. As a remedy to this problem, the invention now proposes a second piston rod, specifically the secondary piston rod, which is provided in a functionally parallel manner to the primary piston rod and can be slightly displaced in relation to the primary piston rod in the piston rod longitudinal direction. In this case, the pretensioning spring, by way of its side which functionally faces the damper piston, is preferably supported on the secondary piston rod, specifically for example by way of a so-called latching pin which is fixedly connected to the secondary piston rod and which, functioning as a driver, can be slightly displaced in relation to the primary piston rod in the piston rod longitudinal direction and, after a stop (which is provided on the primary piston rod, for example in a groove) is reached, carries along the primary piston rod and therefore the damper piston relative to the damper cylinder in the event of further displacement (for example triggered by displacement of the pretensioning piston) of the secondary piston rod. For the purpose of optimizing the vibration insulation and the function(s) according to the invention, the primary piston rod can then be elastically mounted on the vehicle body by a greater extent than the secondary piston rod. In an embodiment of particularly compact construction, the primary piston rod of the damper piston is of hollow design and the secondary piston rod is provided inside said primary piston rod.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
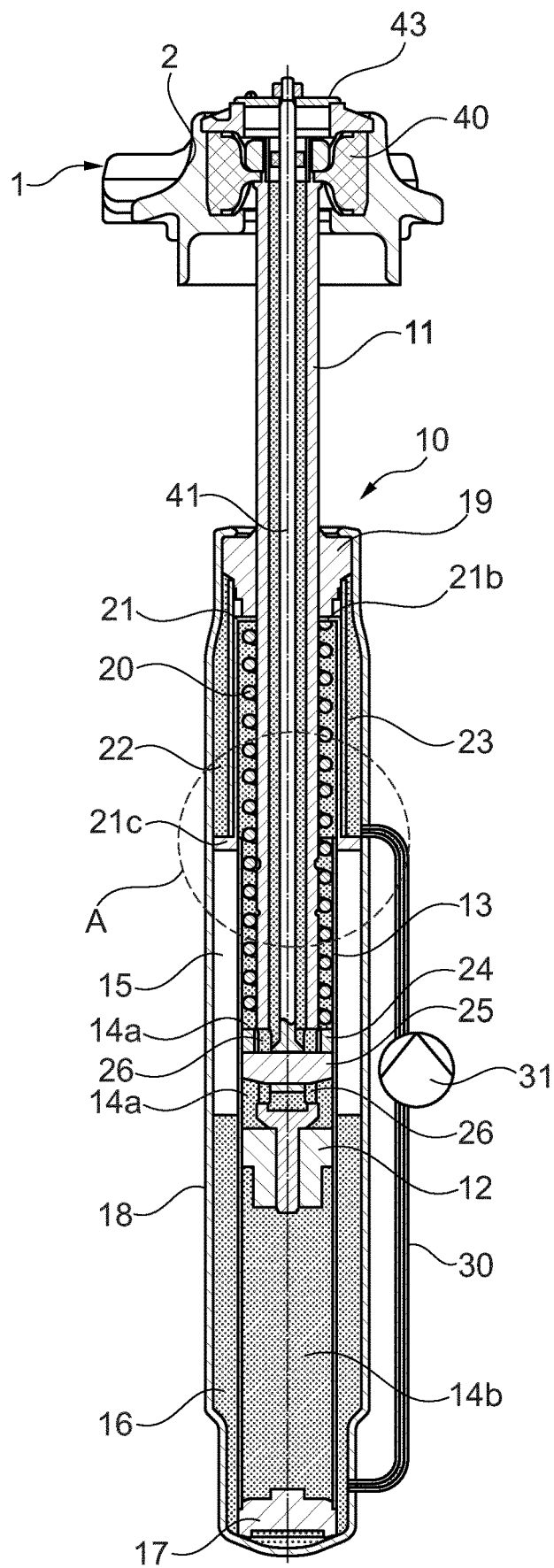
FIGS. 1A and 1B show a section through an exemplary embodiment, wherein a hydraulic vibration damper according to the invention in the installed state in the vehicle is illustrated in two different states in FIGS. 1A, 1B, while a bearing spring which is clamped between a wheel-steering element, not shown, and the vehicle body as is customary is not illustrated.

Reference numeral 1 denotes the vehicle body, not illustrated further, of a passenger car for example, of which or for which body 1 only the so-called supporting bearing 2 for the piston rod 11 of a hydraulic vibration damper, identified by reference numeral 10 in its entirety, is illustrated. The hydraulic vibration damper 10 is provided or supported between the vehicle body 1 and a wheel or a wheel-steering element (not shown) of the vehicle. The vibration damper 10 serves, in particular and amongst other things, to dampen vertical vibrations of the vehicle body 1 in relation to the wheel, which vertical vibrations, as is known, are possible since the vehicle body is supported on the wheel, more precisely on a wheel-steering element, by way of a bearing spring, not illustrated in the figure, for each wheel.

To this end, that is to say for carrying out said vibration damping, the hydraulic vibration damper 10 consists of a damper cylinder 13 in which a damper piston 12, to which the piston rod 11 is substantially rigidly fastened, is displaceably guided in the installation state in the vehicle substantially in the vertical direction. Whereas the piston rod 11, by way of its end which is averted from the damper piston 12, is fastened in the supporting bearing 2, the damper cylinder 13 is not directly, but functionally, substantially fixedly connected to a wheel-steering element. Inside the damper cylinder 13, the damper piston 12 separates an upper damper chamber 14a from a lower damper chamber 14b in which a hydraulic fluid is located. Restricting transfer openings, not shown here, for the hydraulic fluid are provided in the damper piston 12, so that in the event of displacement of the damper piston 12 in relation to the damper cylinder 13, work is performed owing to the restricted transfer of hydraulic fluid, which work damps a displacement movement of this kind and therefore vibration movement of the vehicle body 1 in relation to the wheel.

Since, in the event of displacement of the damper piston 12 downward, that is to say when the damper cylinder 13 moves toward the vehicle body 1, the piston rod 11 enters further into the upper damper chamber 14a, all of the hydraulic fluid which is forced out of the lower damper chamber 14b by the displacement of the damper piston 12 cannot be held in said upper damper chamber 14a. As is customary, a compensation space 16 with an air cushion 15 is provided for volume compensation, a partial quantity of the hydraulic fluid then entering the compensation space through a damping valve 17 which adjoins the lower damper chamber 14b. When, as in the present case, the compensation space 16 and the air cushion 15 enclose the damper cylinder 13 in sections, for which purpose a damper tube 18 which surrounds the damper cylinder 13 so as to form an annular gap is provided, this is the known design of a so-called two-tube damper which is also realized in the present exemplary embodiment. In the case of two-tube dampers, the damper tube 18, in its end region which faces the vehicle body 1, is usually connected in a fixed and leaktight manner to the damper cylinder 13, but this is configured differently in the present case. This will be discussed in more detail further below—however, analogously to the customary prior art, in the present exemplary embodiment the damper tube 18 is also connected to a wheel-steering element or supported against or on a wheel-steering element in a manner not shown, and therefore the damper cylinder 13, which is mechanically fixedly connected to the damper tube 18, is also ultimately or functionally supported on the wheel.

A significant difference between the present damper according to the invention and conventional vibration dampers is a pretensioning spring 20 which is provided inside the damper cylinder 13 and ultimately, that is to say functionally—and in the present case with the interposition of further elements which are still to be explained—, acts on the damper piston 12. The pretensioning spring, by way of its other end, is supported on a so-called pretensioning piston 21 which for its part, by way of its other side, delimits a hydraulic supporting chamber 22 or is supported against said hydraulic supporting chamber. The supporting chamber 22 is located—just like the compensation space 16 but in a different section to the compensation space as viewed over the height of the damper tube 18—in an annular space inside the damper tube 18. However, in this case, the cylinder inner wall of the supporting chamber 22, which cylinder inner wall is oriented in the vertical direction, is not formed by the damper cylinder 13, but rather by an auxiliary cylinder 23 which approximately extends the damper cylinder and has a slightly larger diameter than the damper cylinder 13 but of course has a considerably smaller diameter than the damper tube 18. The auxiliary cylinder 23 is fastened to a closure plug 19 which is provided in the upper end section of the damper tube 18 and is fixedly connected to the damper tube. The abovementioned pretensioning piston 21, by way of its cylindrical outer wall, is displaceably guided inside the auxiliary cylinder 23 in the direction of the cylinder axis (=piston rod longitudinal direction=vertical direction), wherein the pretensioning piston 21 is also of hollow-cylindrical design and, by way of its inner wall, is displaceably guided in sections on the outer wall of the damper cylinder 13. The latter is shown particularly clearly in FIGS. 2A, 2B in the form of enlarged details A, B of FIGS. 1A, 1B. Said FIGS. 2A and 2B also show seals 27 which are provided firstly between the auxiliary cylinder 23 and the pretensioning piston 21 and secondly between the pretensioning piston 21 and the damper cylinder 13 in order to separate the upper damper chamber 14a from the (hydraulic) supporting chamber 22 in as leaktight a manner as possible. However, in this case, small quantities of hydraulic medium which overflow from the supporting chamber 22, which usually has a higher hydraulic pressure, into the upper damper chamber 14a can always be compensated for by the conveying apparatus 31.

Specifically, the pretensioning piston 21 is designed approximately like a cylinder hat, that is to say it has, in addition to the cylinder wall 21a, a terminating cover 21b at the end of its side which faces the vehicle body 1 and a so-called hat brim 21c, which protrudes outward from the cylinder outer wall in the radial direction and was also called a collar before the description of the figures, at its opposite end which faces the damper piston 12. The hat brim (or collar) delimits the air cushion 15 of the compensation space 16 in the downward direction, that is to say as viewed in the direction of the damping valve 17, while the supporting chamber 22 adjoins the other side of the hat brim 21c or the collar 21c. The pretensioning spring 20 is provided inside the hollow-cylindrical pretensioning piston 21 and in so doing is supported on the inner side of the pretensioning piston cover 21b.

By way of its other end which is situated opposite the cover 21b, the pretensioning spring 20 is supported on a disk 24 which lies on a latching pin 25 which extends substantially perpendicularly to the longitudinal axis of the piston rod 11 (=piston rod longitudinal direction). The latching pin 25 crosses the hollow piston rod 11 which is substantially rigidly connected to the damper piston 12 and is also called the primary piston rod 11, as is still to be explained below. In this case, two grooves 26 which extend in the piston rod longitudinal direction or groove-like apertures 26 through which the latching pin 25 passes are provided diametrically opposite one another in the wall of the primary piston rod 11. By way of its two ends, the latching pin 25 bears loosely against the inner wall of the damper cylinder 13.

Figure 1B:
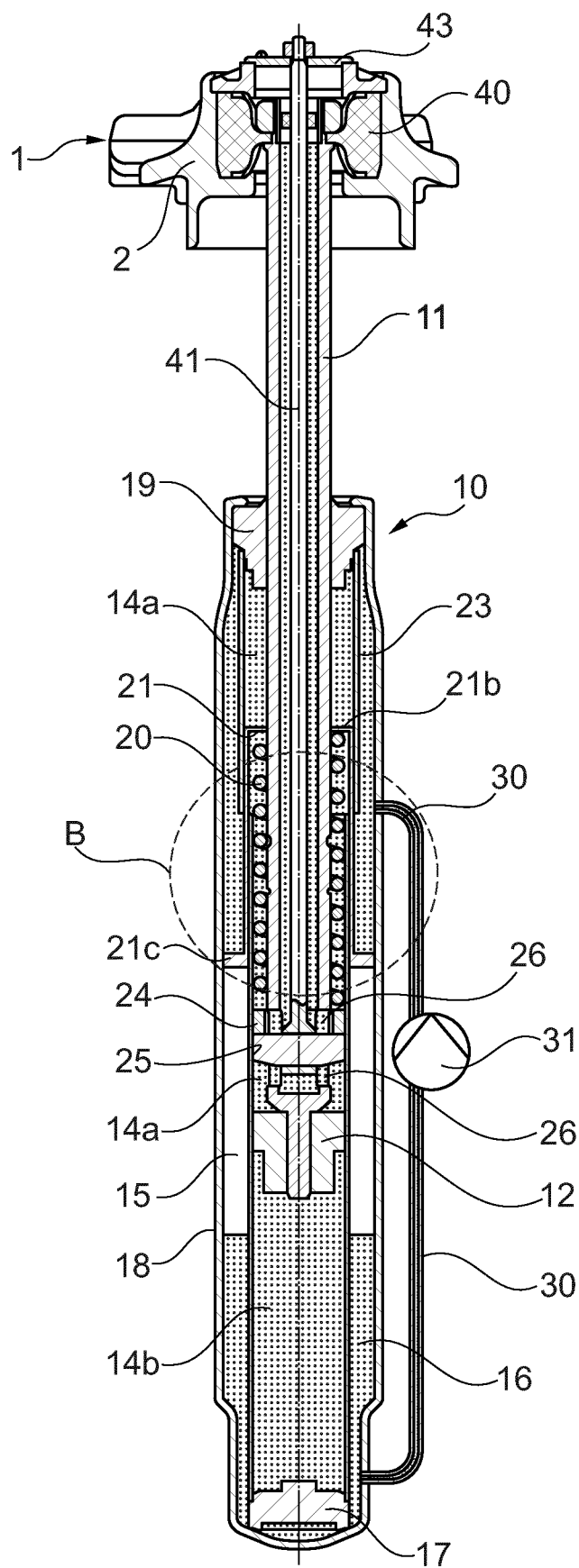
Figure 2A:
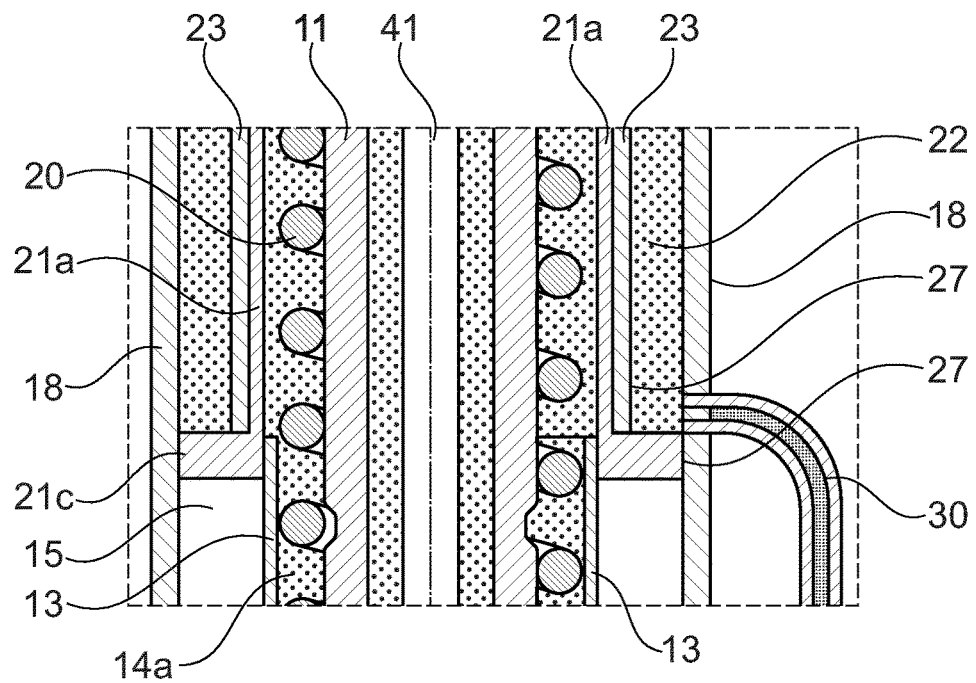
FIGS. 2A and 2B show enlarged details A and, respectively, B of FIGS. 1A and, respectively, 1B.
Figure 2B:
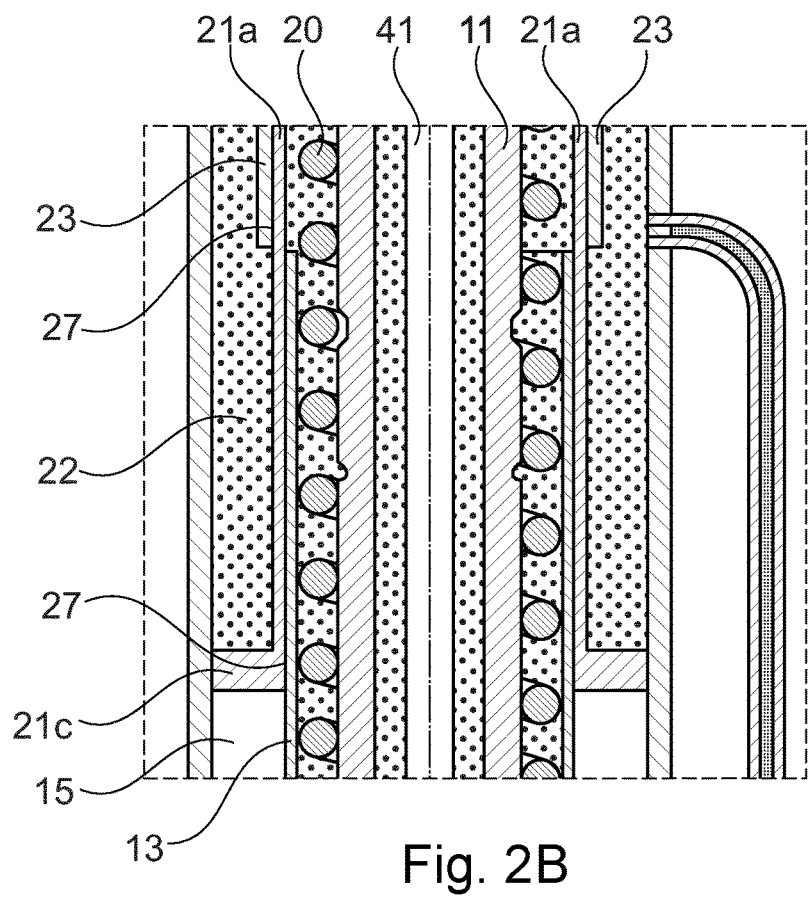

A hydraulic line 30 passes from the compensation space 16 into the supporting chamber 22. A conveying device 31 for hydraulic medium or hydraulic fluid is provided in the hydraulic line 30. The conveying device is designed, for example, as a hydraulic pump, which can be driven in a targeted manner by an electric motor, and possibly also has suitable switchable valves. Hydraulic fluid can be pumped out of the compensation space 16 into the supporting chamber 22 by way of said conveying device 31. As a result, the pretensioning piston 21 is displaced, for example, from its position according to FIG. 1A to the position according to FIG. 1B. Here, the pretensioning spring 20 is initially compressed, as is also shown in the figure. As a consequence of such compression of the pretensioning spring 20, if the weight of the vehicle body 1 is unchanged in comparison to FIG. 1A, the damper piston 12 would be displaced downward (in the direction of the damping valve 17) to a certain extent; this is not illustrated here and would result in a change or reduction in the height of the vehicle body 1. As an alternative, the same height of the vehicle body as in FIG. 1A can be set with the state according to FIG. 1B in the event of a reduction in the weight of the vehicle body 1, for example when a trunk of the vehicle which was previously heavily loaded in accordance with the state according to FIG. 1A is unloaded and therefore the actual bearing spring, not illustrated, mentioned further above was relieved of loading by a certain weight force action. The above explanation makes it particularly clear that the pretensioning spring 20 is connected in parallel with the actual bearing spring, so that the spring stiffnesses of the pretensioning spring and bearing spring are added up. Moreover, the inverse procedure, specifically that a certain quantity of hydraulic medium is discharged from the supporting chamber 22 and introduced back into the compensation space 16, proceeding from a state which is the same or similar to the illustration of FIG. 1B is also possible in any case, this then resulting in (local) raising of the vehicle body 1 in relation to the associated wheel if the weight of the vehicle body 1 is unchanged. Moreover, comparison of FIGS. 1A, 1B reveals a very particular advantage of the present refinement, specifically that the volume of the air cushion 15 can remain approximately unchanged owing to the use of hydraulic fluid, which is located in the compensation space 16, for the purpose of displacing the pretensioning piston 21, and therefore the damping behavior of the hydraulic vibration damper 10 is virtually the same in both states.

The technical background to the latching pin 25, which passes through the grooves 26 in the wall of the primary piston rod 11, and also associated developments, specifically a secondary piston rod 41 in particular, will now be explained below. High forces can be introduced into the system or into the hydraulic vibration damper 10 by the pretensioning spring 20 according to the invention in cooperation with the pretensioning piston 21 according to the invention in such a way that an elastomeric bearing 40, by way of which the primary piston rod 11 is mounted or held in the supporting bearing 2 in a customary manner, would harden here. This is undesirable because the elastomeric bearing 40 can no longer perform a significant additional function, specifically the damping of acoustically disturbing vibrations which would enter the vehicle body 1 from the vibration damper 10 or its piston rod 11, as a result. In order to prevent this, a second piston rod 41, specifically the so-called secondary piston rod 41, is provided, which second piston rod is likewise mounted in the supporting bearing 2 on the vehicle body 1 but is supported or fastened on the vehicle body 1 at a different point and in a manner bypassing the elastomeric bearing 40. Specifically, as is clear, the secondary piston rod 41, which is provided inside the hollow-cylindrical primary piston rod 11 and extends as far as the abovementioned latching pin 25 or is fastened to said latching pin, is screwed into a clamping plate 43 in the supporting bearing 2, which clamping plate rests directly against the supporting bearing 2 there and advantageously secures or fixes the elastomeric bearing 40 in the supporting bearing 2 at the same time.

By way of its other end, the secondary piston rod 41 is, as already mentioned, fastened to the latching pin 25 on which, as has already been stated, the pretensioning spring 20 is supported by means of the disk 24, and which latching pin 25 passes through the wall of the primary piston rod 11 in two (abovementioned) longitudinal grooves 26 or longitudinal groove-like apertures 26 which are situated diametrically opposite one another and extend in the piston rod longitudinal direction. Therefore, a small relative movement of the primary piston rod 11 in relation to the secondary piston rod 41 (and vice versa) is possible as viewed in the piston rod longitudinal direction. This allows, for example, the primary piston rod 11 to execute small mechanical longitudinal vibrations with a small amplitude, which mechanical longitudinal vibrations are damped by the, or in the, elastomeric bearing 40 and the transfer of which mechanical longitudinal vibrations to the vehicle body 1 is largely prevented by the elastomeric bearing 40. In addition, since the pretensioning spring 20 is supported on the secondary piston rod 41 by way of the latching pin 25, as already stated, the force of the pretensioning spring 20 is supported on the vehicle body 1 in a manner bypassing the elastomeric bearing 40.

It goes without saying that a large number of modifications to the exemplary embodiment shown are possible without departing from the spirit of the invention. For example, a suitable roller bearing can also be provided instead of the disk 24, the pretensioning spring 20 then being supported on the latching pin 25 or the like in a more easily rotatable manner by way of said roller bearing. A hydraulic vibration damper 10 which is designed according to the invention can advantageously have virtually the same dimensions as a conventional hydraulic vibration damper (without the pretensioning spring and pretensioning piston) and therefore can readily replace a conventional hydraulic vibration damper.

LIST OF REFERENCE SYMBOLS

1 Vehicle body
2 Supporting bearing
10 (Hydraulic) vibration damper
11 Piston rod, primary piston rod
12 Damper piston
13 Damper cylinder
14a Upper damper chamber
14b Lower damper chamber
15 Air cushion
16 Compensation space
17 Damping valve
18 Damper tube
19 Closure plug
20 Pretensioning spring
21 Pretensioning piston
21a Cylinder wall (of 21)
21b Cover (of 21)
21c Hat brim or collar (of 21)
22 Supporting chamber
23 Auxiliary cylinder
24 Disk
25 Latching pin
26 Groove or longitudinal groove-like aperture
27 Seal
30 Hydraulic line
31 Conveying apparatus
40 Elastomeric bearing
41 Secondary piston rod
43 Clamping plate The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A bearing spring/damper system of a vehicle wheel, comprising:
    a hydraulic vibration damper comprising a damper cylinder and a damper piston which is guided in said damper cylinder,
    wherein
        a piston rod of said hydraulic vibration damper is fastenable to a vehicle body while the damper cylinder is supportable on a wheel-steering element,
        a pretensioning spring is functionally clamped or supported between the damper piston and a pretensioning piston, which pretensioning piston is hydraulically displaceable in a piston rod longitudinal direction within an auxiliary chamber arranged concentrically around at least a portion of the pretensioning piston in the damper cylinder, the pretensioning piston is hydraulically supported in relation to the damper cylinder by way of a supporting chamber between an outer wall of the damper tube and the auxiliary chamber, the supporting chamber containing hydraulic medium of the vibration damper, the pretensioning piston is movable by way of a conveying apparatus which conveys the hydraulic medium into the supporting chamber or allows the hydraulic medium to flow out of said supporting chamber, the pretensioning piston is configured to move in the piston rod longitudinal direction relative to the auxiliary chamber in response to a change in an amount of the hydraulic medium in the supporting chamber, and the pretensioning spring is functionally connected in parallel in a force-transmitting manner, throughout a range of motion of the pretensioning piston in the damper cylinder, to a bearing spring which is clamped between the vehicle body and the vehicle wheel.

2. The bearing spring/damper system according to claim 1, further comprising:

a secondary piston rod configured, in the manner of the piston rod as a primary piston rod rigidly connected to the damper piston, to transmit forces between the damper piston and the vehicle body in the piston rod longitudinal direction, wherein the secondary piston rod is connected to the primary piston rod such that a certain relative movement between the secondary and primary piston rods in the piston rod longitudinal direction is possible, and the pretensioning spring, by way of its end which is averted from the pretensioning piston, is supported against the secondary piston rod.

3. The bearing spring/damper system according to claim 2, wherein the primary piston rod is hollow and the secondary piston rod runs inside the primary piston rod and is mechanically connected to said primary piston rod by way of a latching pin which functions as a driver and is guided such that the latching pin is movable slightly in a longitudinal groove-shaped aperture which runs in the piston rod longitudinal direction in a wall of the primary piston rod.

4. The bearing spring/damper system according to claim 3, wherein a mounting of the primary piston rod on the vehicle body is more elastic than a mounting of the secondary piston rod on the vehicle body.

5. The bearing spring/damper system according to claim 1, wherein the hydraulic vibration damper is constructed as a two-tube damper and the supporting chamber is provided in an annular gap between the damper cylinder and a damper tube which encloses said damper cylinder.

6. The bearing spring/damper system according to claim 5, wherein a compensation space for the hydraulic medium of the vibration damper is located annularly around the damper cylinder and axially adjacent to the supporting chamber, and the conveying apparatus is hydraulically connected to the compensation space.

* * * * *